United States Patent [19]

Doerer et al.

[11] 4,418,031

[45] Nov. 29, 1983

[54] MOLDABLE FIBROUS MAT AND METHOD OF MAKING THE SAME

[75] Inventors: Richard P. Doerer, Grosse Pointe, Mich.; Joseph T. Karpik, Floodwood, Minn.

[73] Assignee: Van Dresser Corporation, Troy, Mich.

[21] Appl. No.: 352,501

[22] Filed: Mar. 2, 1982

Related U.S. Application Data

[63] Continuation-in-part of Ser. No. 251,239, Apr. 6, 1981.

[51] Int. Cl.³ .............................................. B28B 9/00
[52] U.S. Cl. ................................... 264/241; 264/122; 264/257; 264/259; 428/288; 428/326
[58] Field of Search ....................... 428/288, 296, 326; 264/122, 241, 257, 259

[56] References Cited

U.S. PATENT DOCUMENTS 2,483,405 10/1949 Francis .............................. 428/296
4,247,510 1/1981 Desverchere ...................... 264/259

Primary Examiner—James J. Bell
Attorney, Agent, or Firm—Barnes, Kisselle, Raisch, Choate, Whittemore & Hulbert

[57] ABSTRACT

A moldable fibrous mat from which a product of predetermined shape can be molded by the application of heat and/or pressure. The mat consists essentially of base fibers and carrier fibers with the base fibers having a substantially higher softening temperature, if any, than the carrier fibers. The fibers intertwine to resist separation. The carrier fibers are bonded to the base fibers and to each other to form connections. There is also disclosed a method by which the moldable fibrous mat is made and product made from the mat, which product may be of uniform density or have areas of differing density.

8 Claims, 5 Drawing Figures

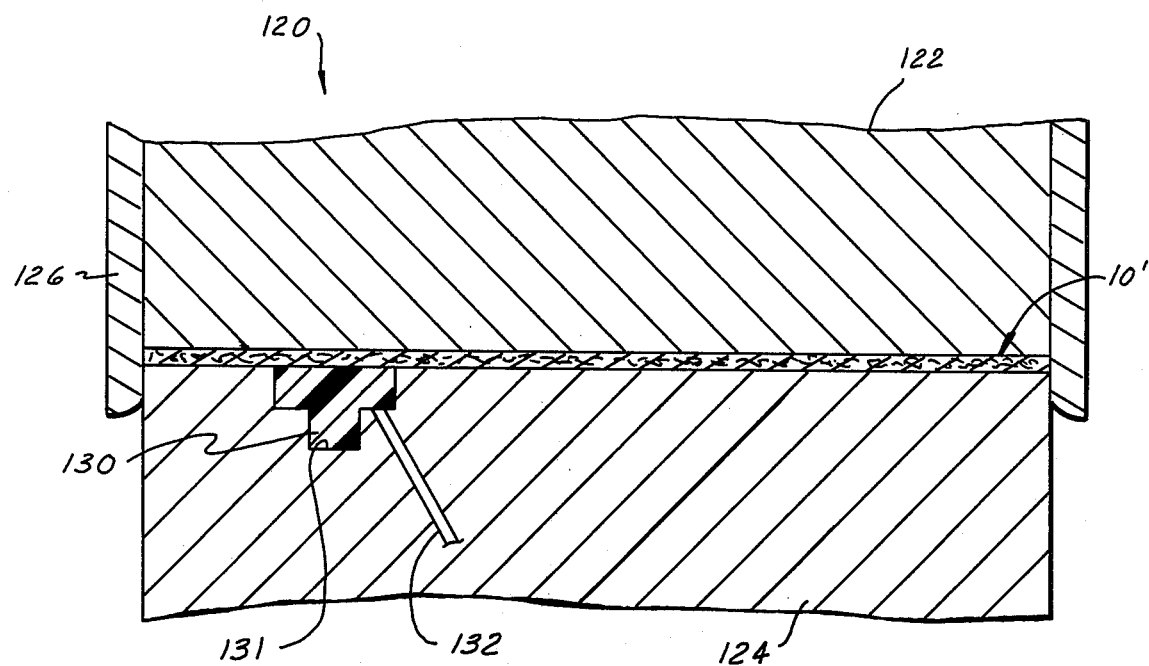

MOLDABLE FIBROUS MAT AND METHOD OF MAKING THE SAME

REFERENCE TO RELATED APPLICATION

This application is a continuation-in-part of our prior copending application, Ser. No. 251,239 filed Apr. 6, 1981.

The invention relates generally to fiber technology. The fibers may, for example, be of tubular, solid or cellular form and are of natural or synthetic material. More particularly, the invention refers to a flexible, handleable fibrous mat which is capable of being molded into a self-supporting shaped end product by the application of heat and/or pressure, the process by which said mat is produced, and also the process by which the mat is converted to an end product. The mat consists essentially of base fibers and carrier fibers with the base fibers having a substantially higher softening temperature, if any, than the carrier fibers. The fibers intertwine to resist separation. The carrier fibers are bonded to the base fibers and to each other to form connections. The end product made from this mat can be molded into a wide variety of shapes. The product may be of uniform density or it may have areas of differing density.

PRIOR ART

Non-woven fibrous material made by a dry process is well known in the prior art. British Pat. No. 1,088,991 discloses a method of making a web composed of fine, paper-making pulp and synthetic fibers for use as disposable diapers and other absorptive products. British Pat. No. 1,171,941 discloses a non-woven fabric of cotton and polypropylene fibers having wet strength and useful as a material for wiping cloths and for surgical purposes. British Pat. No. 1,581,486 discloses a non-woven fabric for use as an absorbent wiping material and composed of polymeric microfibers and wood pulp fibers held together in a mechanical entanglement. British Pat. No. 1,185,623 discloses a fibrous structure in the form of a fleece that may be used as a blanket or carpet underlay and which is made of polyamide and/or polyester fibers constituting first fibers, together with second fibers of polyamide having a lower melting point than the first fibers. The second fibers when heated lose their fibrous identity and coat the first fibers to weld them together. British Pat. No. 1,118,163 discloses non-woven fabric for use in making articles of apparel formed of filaments or fibers bonded together by the adhesive characteristics of one of the fiber components. U.S. Pat. No. 2,483,405 discloses a non-woven fibrous product comprising a blend of non-adhesive fibers admixed with "synthetic fibers having cross-sectional areas varying irregularly throughout the lengths thereof and being of a smaller diameter than fibres obtainable by extrusion of said fibre-forming material through rayon spinnerettes and consequently contacting said non-adhesive fibres at substantially more points of contact than an equal weight of the synthetic fibres formed by such extrusion." U.S. Pat. No. 4,265,954 discloses a non-woven fiber which is fused selectively in chosen areas while blocking fusion elsewhere.

All of the above inventions are refinements of the basic non-woven technology based on heat-sealing or mechanically entangling fibers for the purpose of obtaining a handleable web without weaving. However, none of the products to date have been moldable, that is, intended to be and capable of being molded into a self-supporting, shaped end product by the application of heat and/or pressure. This invention, for the first time, fills the need for a highly moldable material made through a dry process.

BACKGROUND AND SUMMARY OF THE INVENTION

While a variety of different fibers may be used in carrying out this invention, fibers of cellulosic material are stressed throughout this specification not only because of their suitability, but also because many are readily available from virgin or reclaimable sources and are relatively inexpensive. Wood fibers constitute an example of such a cellulosic material. These wood fibers, sometimes referred to as base fibers, are intertwined with and bonded to carrier fibers to create a moldable fibrous mat. The carrier fibers are adapted to melt under the heat and/or pressure of a subsequent operation in which the mat is molded into a product of predetermined shape.

Prior art in compressed wood fiber technology includes fiberboard, particle board and hardboard, terms applied to a variety of products made primarily from wood fibers, wood chips or shavings. These are not substantially formable. Extreme shapes, similar to those attainable through this invention, can be achieved by a so-called wet slurry process in which wood fibers are mixed with water and other chemicals and formed into a slurry which is applied over a pattern having the desired form. While satisfactory products can be made by the wet slurry process, it is a relatively expensive process not only in terms of the amount of energy required but also because of its long manufacturing cycle time and the cost of cleaning the effluent resulting from the process prior to dumping. This invention, however, relates to a dry process and product made therefrom.

It has also been known to form wood fiber based products by dry processing, but these previously known dry processes are capable of producing products having only relatively flat simple shapes.

It is a primary object of this invention to provide a unique dry process of forming a flexible mat consisting essentially of base and carrier fibers, the base fiber being a natural or synthetic fiber, and the carrier fiber being a linking fiber adapted to intertwine or interlock with the base fibers. The base and carrier fibers may be either virgin or reclaimed. Suitable base fibers are made of materials such, for example, as wood, jute, sisal, cotton, coconut, kapok, rayon, acetate, triacetate, paper, graphite, glass, mineral wool, and other synthetic and natural fibers. Products having far more difficult and complex shapes can be made from the material produced by this new dry process than could possibly be made by previously known dry processes. Material made by the method of this invention can be molded relatively fast and inexpensively into a variety of items such, for example, as decorative trim panels, automotive headliners, door panels, instrument panels, center trim pillars, package trays, consoles, furniture, luggage, building materials, packaging, automotive components, and the like. Such a product may have areas of differing density to provide portions that are soft to the touch or to provide visual embossing, and to provide both thermal and acoustical insulation. The ability to mold a self-supporting product with areas of low density eliminates the need for separate foam pads to be attached, thus offering significant economies.

A further object is to provide relatively flat, flexible, moldable fiber mat in continuous sheet or in sections from which products can be made; also to provide a method of making the mat into a final product and the end product itself.

In accordance with a specific embodiment of the invention, the mat may comprise a mixture of wood fibers and thermoplastic carrier fibers that mechanically intertwine or interlink with the wood fibers and are bonded or adhered to them to form interlocking connections which resist separation. The mat fibers are adhered together by heating the mat to a temperature and for a period of time such that the thermoplastic carrier fibers soften and become sufficiently tacky to heat-seal to the wood fibers and to each other, but still substantially retain their essentially fibrous form. The carrier fibers add substantial flexural strength to the mat so that even when products molded therefrom have complicated or difficult shapes and include sharp bends and cut-outs, the body of the mat will nevertheless hold together without ripping or tearing when the mold parts close. Other materials may be added to the formulation of the mat depending upon the characteristics desired in the finished product. As an example, a suitable thermosetting resin may be employed which will cure and set during molding to add structural stiffness and heat distortion resistance to the product.

A further object is to provide a process for molding the product described above and simultaneously molding and fusing a mounting bracket thereto, and the resulting end product.

These and other objects and features of the invention will become more apparent as the following description proceeds, especially when considered with the accompanying drawings.

BRIEF DESCRIPTION OF THE DRAWINGS

FIG. 5 is an fragmentary elevational view of another embodiment, showing a product being made in a mold, and also showing an attachment being simultaneously molded and fused to the product.

DETAILED DESCRIPTION

Referring now more particularly to the drawings, the numeral 10 generally designates a product which is relatively stiff or self-supporting, and 12 generally designates a section of moldable fibrous mat from which the product is made.

Figure 4:
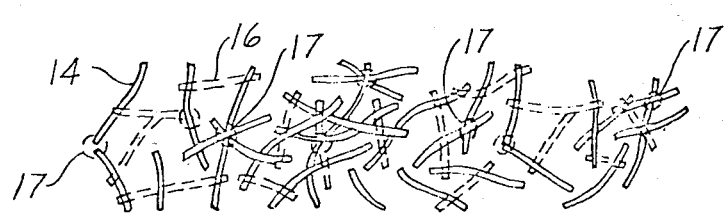
FIG. 4 is an enlarged fragmentary diagrammatic view showing the relationship between fibers in the moldable mat.

The moldable mat section 12 is formed of a multiplicity of fibers, virgin or reclaimed, including a mixture of base fibers 14 and carrier fibers 16. In FIG. 4, the base fibers 14 are shown in solid lines and the carrier fibers in dotted lines as a simple means of distinguishing between the two. The base fibers 14 may be of natural or synthetic materials. Suitable natural materials may be cellulosic such as wood, paper, coconut, cotton, jute, sisal or kapok. Suitable synthetics might be fibers of glass, rayon, acetate or triacetate. Other suitable materials would be mineral wool and graphite. Preferably the base fibers are of wood, virgin or reclaimed, and are obtained from any suitable tree, such for example, as the aspen. The carrier fibers may be made of material selected from the vinyl family, the polyester family, the polyolefin family, the polyamide family, and any physical or chemical combination of those families. Examples of polyolefins are polyethylene and polypropylene. An example of a polyamide is nylon. Examples of vinyls are Saran, Vinyon and polyvinyl chloride (PVC). Saran is a polymer composed of at least 80% by weight of vinylidene chloride. Under the Textile Fiber Products Identification Act, any fiber containing 85% or more vinyl chloride may be labeled "Vinyon" and this includes 100% PVC fiber. Preferably the carrier fibers are thermoplastic in nature and excellent results have been achieved with polyolefins. The carrier fibers are intertwined or interlinked with the base fibers. The carrier fibers add flexural strength to the mat, and resist separation of the base fibers from the mat and accordingly make the mat more flexible so that it will hold together without tearing or breaking despite rough handling and also when the mold parts close on it to mold a product. Both the base fibers and the carrier fibers are substantially uniformly distributed throughout the body of the mat. The base fibers preferably comprise the greater number and the greater weight of fibers in the mat.

In addition to being mechanically intertwined, the base and carrier fibers of the mat are also bonded or adhered to one another where indicated diagrammatically at 17 in FIG. 4. While a separate bonding agent may be employed, preferably the carrier fibers themselves serve this purpose. As stated, the carrier fibers are preferably thermoplastic. During the manufacture of the mat, the mat is heated sufficiently to soften the thermoplastic carrier fibers and render them tacky. Hence, the carrier fibers of the mat retain their fibrous nature, and are generally recognizable as such, but heat-seal to one another and to the base fibers to form connections when the carrier fibers cool. The base fibers, whether of wood or any other material, will not significantly soften or otherwise be affected by the temperature to which the mat is heated to tackify the thermoplastic carrier fibers.

Figure 3:
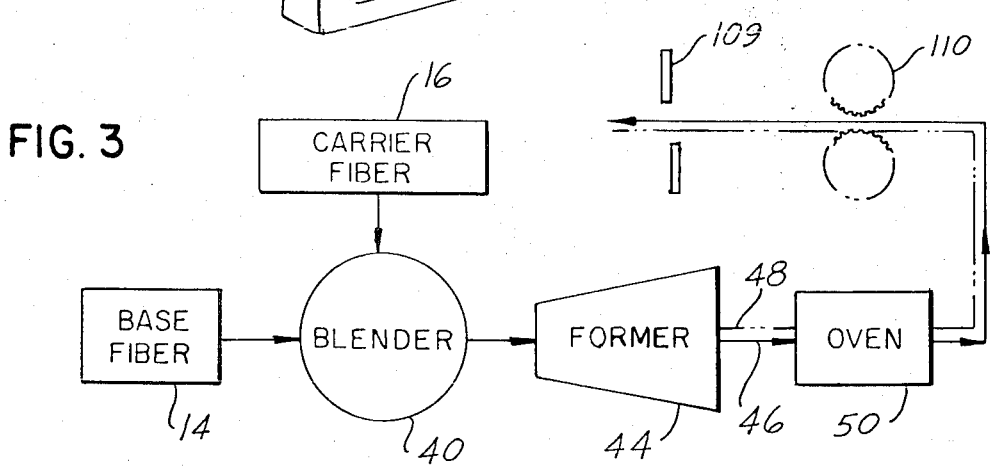
FIG. 3 is a flow diagram of the method by which the moldable mat is made.

In its simplest form, the mat consists only of the two fibers referred to above, namely the base fibers which may be any of those previously identified, but preferably are wood, and the carrier fibers which also may be any of those previously identified but preferably are thermoplastic such as a polyolefin. These fibers are mixed together in a blender 40 (FIG. 3) by any suitable means so that they are uniformly distributed throughout the batch. This initial mix may consist of about 70% to 98% by weight of base fibers and about 2% to 30% by weight of thermoplastic carrier fibers, but preferably about 85% by weight of base fibers and about 15% by weight of thermoplastic carrier fibers.

From the blender 40, the mix is passed through a former 44 which is a device for distributing the mix on a moving belt 46 in a desired width and thickness to provide a continuous web 48 of mat material. The web 48 of mat material is transported on the belt through a curing oven 50 at a temperature and speed such that the material of the web remains in the oven only long enough to soften the thermoplastic fibers and make them tacky. Hence the thermoplastic fibers remain generally recognizable as fibers but, being tacky, they heat-seal to the base fibers and to each other to form connections when the mat cools. The thermoplastic fibers may be any of those previously identified, but if made of polyethylene, the oven 50 may, for example be maintained at a temperature in the range of about 250° F. to about 370° F. and the web will remain in the oven about one to three minutes. Temperature of the oven and web speed will, of course, vary depending upon the thermoplastic material employed, mat thickness, moisture content and mat density. The base fibers would not soften or otherwise be affected except at a substantially higher temperature or longer dwell time in the oven 50, if at all.

Figure 1:
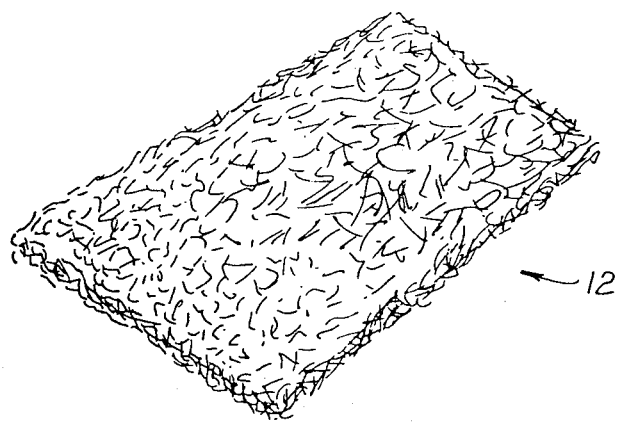
FIG. 1 is a perspective view of a section of fibrous mat made according to the present invention.

The web 48 of mat material after it leaves the oven 50 may be transported to a crimping device which in this case is a pair of crimping rolls 110 which are cylinders having peripheral grooves extending lengthwise of said cylinders defining ribs between which the mat material passes. These crimping rolls 110 further increase the flexibility of the web of mat material, permitting it to be handled and bent or flexed without breaking. After leaving the crimping rolls 110, the web of material may be stored in roll form until ready for use or it may be immediately cut into invidual mat sections of the type shown in FIG. 1 by a cutter 109 in FIG. 3.

The manufacture of the mat upon leaving the crimping rolls and being cut into sections is complete. It is essentially dry, containing minimum moisture. The carrier fibers which are intertwined and interlocked with the base fibers hold them together and resist separation of the base fibers from the body of the mat. The fibers are adhered to or heat-sealed together by the thermoplastic carrier fibers. Mat sections shown in FIG. 1 cut from the web 48 of mat material after it leaves the crimping rolls 110 consist of a coherent mass which can be stacked, banded together in packs, compresssed, picked up, molded into a product, and in general handled without coming apart or breaking or tearing.

Figure 2:
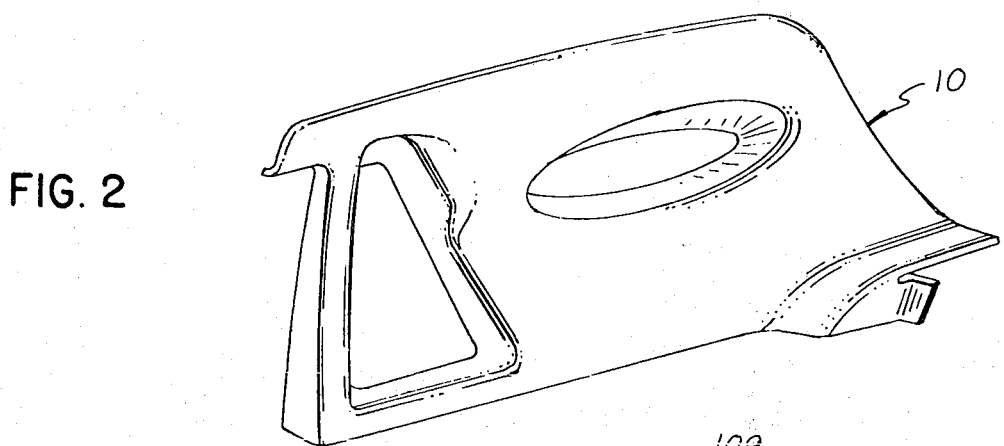
FIG. 2 is a perspective view of a typical product that can be made from the section of moldable mat shown in FIG. 1.

The mold for making products 10 in FIG. 2 from the essentially dry mat has mold parts shaped to the desired configuration of the final product. The mold may be operated at a temperature of about 325° F. to 590° F., at a pressure of about 200 to 1000 psi. The mold cycle time may be as little as one minute or less. Actually, the temperature, pressure, and time cycle required will vary depending on the final product requirements. The thermoplastic fibers soften and most, if not all, melt in the mold. Upon cooling the thermoplastic hardens to form a finished product which can be self-supporting, that is capable of holding its shape. The base fibers retain their fibrous form during molding, neither charring nor burning at the temperature of the mold, and impart tensile strength and stiffness to the product. The mold 120 shown in FIG. 5 in connection with another embodiment and having the mold parts 122 and 124 would be suitable for making the product 10.

Products can be molded of the material made by the dry process of this invention with configurations just as complex and with bends as sharp and angles of as small radii as by the wet slurry process; and yet this dry process, together with the subsequent molding of the product, is faster and less expensive than the wet slurry process. The wet slurry process requires substantially greater energy input than this dry process and subsequent molding operation in order to remove the great amount of moisture inherent in the wet slurry process. The wet slurry process requires special equipment to handle large amounts of water and to clean up the effluent. Such equipment is not needed in this dry process. The wet slurry process also requires more than one mold to make a product, whereas with the material made by this dry process a product is formed from the mat in a single step in a single mold. Products can be formed from this dry process material with far more difficult and complex shapes than could be attained from dry process materials heretofore in use.

Many different products can be produced from the dry process material of this invention, such for example, as decorative trim panels, automotive headliners, door panels, center trim pillars, package trays, consoles, furniture, luggage, building materials, packaging, automotive components and other molded products.

To summarize, the thermoplastic carrier fibers are mixed with the base fibers to intertwine with them to strengthen the mat and hold it intact when compressed between the mold parts to form a panel or other product. When the mat is heated in the oven, the carrier fibers become tacky and form a multiplicity of interlocking connections between fibers. Although the carrier fibers retain their identity as fibers in the mat, they melt in the molding of a panel or other product. As the product cools after molding, the thermoplastic hardens to bind the base fibers into a molded form which is self-supporting, that is, stiff enough to retain its shape. It should be understood that the product may be used alone or as a layer in a laminated structure in which one or more additional layers of the same or different material are laminated thereto.

As previously stated, fibers other than wood and polyethylene may be employed with similar results. For example, base fibers of glass and carrier fibers of propylene may be mixed in varying percentages. These when processed as above described may be made into a mat from which panels and other products can be molded, change being made in the oven temperature and speed of travel through the oven as may be necessary to tackify the polypropylene fibers sufficiently to effect a heat-sealing together of the fibers, and in the mold temperature, pressure and time as may be necessary to melt the polypropylene and form a finished product. The glass fibers have a higher softening point than the polypropylene fibers and, therefore, will not soften or otherwise be affected by the oven temperature employed to soften and tackify the polypropylene fibers.

Supplementary carrier fibers are sometimes added to the composition of the mat. Examples of supplementary carrier fibers are acrylics, modacrylics, metallics and elastomers including rubbers and urethanes. These particular supplementary carrier fibers have relatively high heat-resistance and would not normally soften in the oven, but impart special properties to the mat and to the product. Thus, the acrylics and modacrylics add softness and suppleness, the elastomers add stretchability and resilience, and the metallics act as a "heat sink."
'Certain of the previously identified carrier fibers which would normally soften in the oven also add special properties to the mat and to the product. Thus, polyethylene and polypropylene impart abrasion resistance and are hydrophobic, the polyesters are also hydrophobic, and the polyamides, particularly nylon, impart high heat resistance to the mat and to the finished product.

There may also be dispersed throughout the mat a thermosetting material, such as a phenolic resin. This resin would not be affected by the oven temperature but would cure and set in the molding of the finished product. The purpose of adding the thermosetting material would be to enhance the stiffness of the product and make it less likely to sag or lose its shape while still hot from the mold and also when subjected to high ambient temperatures in ultimate use. A suitable mix of materials might consist of 85% by weight wood fibers, 10% by weight polypropylene carrier fibers and 5% by weight of phenolic resin.

In addition to thermoplastic carrier fibers, there are other thermoplastic materials that may be added to the mix from which the mat is formed. The added material would be dispersed throughout the body of the mat and have a softening point approximately the same as that of the thermoplastic carrier fibers, or at least such that it would soften in the oven, to serve as a bonding agent between the base and carrier fibers. The use of the added thermoplastic material would supplement the bonding action of the thermoplastic carrier fibers, or the carrier fibers could be made of some other, perhaps less expensive, material without the capability of softening in the oven, in which event the bonding together of the fibers in the mat and in the finished product would be effected by the added thermoplastic material. An example of a less expensive material from which the carrier fibers might be made is shoddy which is about 35% cotton and about 65% polyester. A suitable mix with percentages by weight might consist of 85%–87% wood fibers, 5% polyethylene resin, 3–5% shoddy, and 5% phenolic resin. The oven temperature employed to make a mat from this mix would be sufficient to soften the polyethylene but not sufficient to soften or otherwise affect the fibers.

The mat has been described as something from which a product can be molded by the application of heat and/or pressure. Actually, however, the mat itself may serve as an end product. As such, the mat my be given a predetermined shape as by draping it over a form immediately after it leaves the oven and while the thermoplastic fibers are still in a heat-softened condition and the mat is flexible, so that the mat will assume the shape of the form. The thermoplastic fibers form heat-sealed connections between fibers and upon cooling harden or set to bind the mat into the shape imparted to it by the form. The mat, when an end product, may be used as a filter or as heat or sound insulation or packaging or cushioning material. It may be used alone or as one layer of a laminated or multi-layer product. Another layer or layers of the same or different material might extent over an outer surface of the mat or internally thereof to complete the laminated product.

The carrier fibers of the mat previously referred to as having the capability of softening or tackifying in the oven have all been thermoplastic by nature. However, it is possible to use carrier fibers which are thermosetting. For example, carrier fibers formed of phenolic resin may be mixed with suitable base fibers selected from those previously listed and heated in the oven 50 at a suitable temperature for an appropriate period of time to cause the carrier fibers to cure and set the form bonded connections to the base fibers.

Although the tackifying of the carrier fibers to cause them to form bonded connections with the base fibers has been described as being carried out by heating the mat in an oven, and excellent results may be achieved by this method, it should be understood that the carrier fibers can be activated or tackified by other means such, for example, as by a chemical activating agent or by radiation curing. Moisture may serve as a chemical activating agent. Thus, the mat may be passed through a water vapor chamber instead of the oven 50, so that the carrier fibers will soften and become tacky and seal or bond to the base fibers. Ammonia is another chemical activating agent that may be employed. Radiation curing of the carrier fibers to make them tacky may be effected, for example, by gamma rays, ultra-violet rays or an electron beam.

FIG. 5 shows another embodiment of the invention in which the produce 10', which may be similar to the product 10, is made in the mold 120 from an essentially dry mat 12 having a composition like any previously described. The confronting faces of the mold parts 122 and 124 are shaped to the desired configuration of the product 10'. The upper mold part has a skirt 126 for trimming or confining the mat when the mold closes. The mold parts are relatively movable toward and away from each other, and are shown in the closed position during molding. The mold may be operated in the temperature and pressure ranges and at the cycle time previously recommended with the results already stated, to form a self-supporting finished product.

This embodiment differs from those previously described in that an attachment 130 is bonded to one side or surface of the product 10'. The attachment 130 is formed of a moldable plastic, such, for example, as a polyester or phenolic resin, and is bonded to the product simultaneously with the molding or making of the produce in the mold. The material of which the attachment is made is such that it will cure or set during the cycle time and at the temperature and pressure employed to mold the product.

As shown, one of the mold parts, in this instance the lower mold part 124, has a cavity 131 in its mold face corresponding in shape to that of the attachment. Immediately after the mold is closed, as in FIG. 5, and at the beginning of the cycle time during which the product 10' is molded under prescribed heat and pressure, a shot of the material of which the attachment is to be made is introduced through a passage 132 into the cavity, filling the cavity with such material and holding it under suitable pressure against the surface of the product being formed in direct surface-to-surface contact therewith. The material in the cavity will cure or set in the cycle time and at the temperature and pressure of the mold for molding the product, with the result that at the end of the molding cycle when the mold is opened, the material of which the attachment is formed will be molded and set and will be permanently bonded to the surface of the product in direct surface-to-surface contact therewith. The attachment 130 is thus molded and bonded to the product simultaneously with the molding of the product.

As an alternative to injecting the attachment-forming material into the cavity through passage 132, a charge of the attachment-forming material may be deposited in the cavity by hand while the mold is open and before the mat is introduced into the mold.

We claim:

1. A two-stage method of manufacturing a permanently rigid shaped end product comprising:
   (1) in a first stage and by a dry process, making a soft, flexible, handleable fibrous mat by providing a mixture consisting essentially of cellulose base fibers, linking and activatable bonding means including carrier fibers, and a thermosetting ingredient, forming said mixture into a mat in which said fibers are interspersed, activating said bonding means to cause said carrier fibers to bond to said base fibers and to each other forming connections therebetween and holding said fibers together, said thermosetting ingredient remaining in an uncured state during said activation of said bonding means and (2) thereafter making said end product in a second stage at any later time by subjecting said mat to sufficient heat and pressure in a compression molding operation to cause said thermosetting ingredient to cure and to compress the material to the desired thickness and density, and molding and bonding an attachment to said end product simultaneously with the making of said end product and in said compression molding operation, thereby completing the manufacture of said end product.

2. A method as defined in claim 1, wherein said base fibers are wood.

3. A method as defined in claim 1, wherein said carrier fibers are thermoplastic in nature, and wherein said bonding is caused by heating the said thermoplastic carrier fibers to their tack point but not to melting, thus maintaining their essentially fibrous form, said tack point being below the curing temperature of the thermosetting ingredient involved, thereby avoiding any curing in stage 1.

4. A method as defined in claim 3, wherein said carrier fibers are formed of thermoplastic material selected from the group consisting of the vinyl family, the polyester family, the polyolefin family, the polyamide family and any physical or chemical combination of the above families.

5. A method as defined in claim 1, wherein said bonding means includes a chemical bonding agent which effects the aforesaid bonding of said base and carrier fibers.

6. A method as defined in claim 1, 2, 3, 4 or 5, wherein said attachment is made of a thermosetting material which is cured and bonded as aforesaid by the heat employed in the molding of said end product.

7. A method as defined in claim 6, wherein said thermosetting material is a polyester resin.

8. A method as defined in claim 6 wherein said thermosetting material is a phenolic resin.

* * * * *